(12) United States Patent
Huang et al.

(10) Patent No.: US 10,396,562 B2
(45) Date of Patent: Aug. 27, 2019

(54) SERIES COMPENSATION DEVICE APPLICABLE TO DOUBLE-CIRCUIT LINE

(71) Applicants: NR Electric Co., Ltd, Jiangsu (CN); NR Engineering Co., Ltd, Jiangsu (CN)

(72) Inventors: Ruhai Huang, Jiangsu (CN); Yu Lu, Jiangsu (CN); Yunlong Dong, Jiangsu (CN); Lei Pan, Jiangsu (CN); Defeng Qiu, Jiangsu (CN); Chongxue Jiang, Jiangsu (CN); Jiang Lu, Jiangsu (CN); Gang Li, Jiangsu (CN); Zhaoqing Hu, Jiangsu (CN); Nannan Wang, Jiangsu (CN); Jiudong Ding, Jiangsu (CN); Ke Wang, Jiangsu (CN); Xianlai Hu, Jiangsu (CN); Hui Wang, Jiangsu (CN); Shunke Sui, Jiangsu (CN)

(73) Assignees: NR ELECTRIC CO., LTD, Jiangsu (CN); NR ENGINEERING CO., LTD, Jiangsu (CN)

(*) Notice: Subject to any disclaimer, the term of this patent is extended or adjusted under 35 U.S.C. 154(b) by 0 days.

(21) Appl. No.: 16/319,300

(22) PCT Filed: Aug. 15, 2017

(86) PCT No.: PCT/CN2017/097478
§ 371 (c)(1),
(2) Date: Jan. 18, 2019

(87) PCT Pub. No.: WO2018/033059
PCT Pub. Date: Feb. 22, 2018

(65) Prior Publication Data
US 2019/0157871 A1 May 23, 2019

(30) Foreign Application Priority Data

Aug. 16, 2016 (CN) .......................... 2016 1 0677937

(51) Int. Cl.
*H02J 3/00* (2006.01)
*H02J 3/36* (2006.01)
(Continued)

(52) U.S. Cl.
CPC .................. *H02J 3/36* (2013.01); *H02J 3/00* (2013.01); *H02J 3/1807* (2013.01); *H02J 3/1814* (2013.01); *H02M 7/7575* (2013.01)

(58) Field of Classification Search
CPC .......... H02J 3/18; H02J 3/36; H02J 2003/365; H02J 3/00; H02J 3/1807; H02J 3/1814;
(Continued)

(56) References Cited

U.S. PATENT DOCUMENTS

| | | | |
|---|---|---|---|
| 5,666,277 A | 9/1997 | Björklund et al. | |
| 6,335,613 B1* | 1/2002 | Sen | G05F 1/12 323/211 |

(Continued)

FOREIGN PATENT DOCUMENTS

| | | |
|---|---|---|
| CN | 103414185 A | 11/2013 |
| CN | 105680453 A | 6/2016 |

(Continued)

OTHER PUBLICATIONS

WIPO, Chinese International Search Authority, International Search Report dated Oct. 24, 2017 in International Patent Application No. PCT/CN2017/097478, 4 pages.

*Primary Examiner* — Adolf D Berhane
(74) *Attorney, Agent, or Firm* — Masuvalley & Partners

(57) ABSTRACT

A series compensation device suitable to double-circuit lines is disclosed. The device includes one series transformer and one converter. One converter and dual-circuit transmission lines are respectively connected to three windings of one series transformer. In the solution provided in the present application, the device can be independently installed in a (Continued)

power transmission system to be used as a static synchronous series compensator, and can also be used as a component of a unified power flow controller, a convertible static compensator, an interline power flow controller and a unified power quality conditioner to be connected to a power transmission system device in series. The device can save the capacity of a converter, improve the application efficiency of the series compensation device, and reduce the cost and area occupation.

9 Claims, 3 Drawing Sheets

(51) Int. Cl.
  *H02J 3/18* (2006.01)
  *H02M 7/757* (2006.01)
(58) Field of Classification Search
  CPC ...... H02M 7/7575; H02M 7/757; H02M 7/72; H02M 7/68
  See application file for complete search history.

(56) References Cited

U.S. PATENT DOCUMENTS

| | | | |
|---|---|---|---|
| 2004/0090213 A1* | 5/2004 | Barthold | H02J 3/36 323/207 |
| 2011/0082653 A1* | 4/2011 | Balcerek | G01R 31/088 702/59 |
| 2015/0029764 A1* | 1/2015 | Peng | H02M 7/49 363/37 |
| 2017/0003335 A1* | 1/2017 | Kang | G01R 31/085 |
| 2018/0198377 A1* | 7/2018 | Keister | H02M 1/08 |
| 2019/0028029 A1* | 1/2019 | Bieber | H02M 3/158 |

FOREIGN PATENT DOCUMENTS

| | | |
|---|---|---|
| CN | 106130020 A | 11/2016 |
| CN | 205945059 U | 2/2017 |
| WO | WO2007/102758 A1 | 9/2007 |

* cited by examiner

SERIES COMPENSATION DEVICE APPLICABLE TO DOUBLE-CIRCUIT LINE

RELATED APPLICATIONS

This application is the U.S. National Phase of and claims priority to International Patent Application No. PCT/CN2017/097478, International Filing Date Aug. 15, 2017, entitled Series Compensation Device Applicable To Double-Circuit Line; which claims benefit of Chinese Patent Application No. 201610677937.1 filed Aug. 16, 2016; both of which are incorporated herein by reference in their entireties.

FIELD OF THE INVENTION

The invention relates to the field of flexible alternating current (AC) transmission, and particularly relates to a series compensation device suitable for double-circuit lines.

BACKGROUND OF THE INVENTION

The equipment for flexible AC transmission system (FACTS) can be divided into series compensation devices, parallel compensation devices and integrated control devices. The parallel compensation devices can be directly connected to various levels of power grids, while series compensation devices and integrated control devices need to be connected to power grids in series at one end, and thereby their connection modes should be studied in comprehensive consideration of reliability, flexibility and security thereof.

In series compensation devices and integrated control devices, static synchronous series compensator (SSSC), unified power flow controller (UPFC), inter-line power flow controller (IPFC) and convertible static compensator (CSC) are all flexible power transmission devices that can improve the transmission and control capabilities of the system; there is also a unified power quality regulator (UPQC), which can improve the power quality of lines. In addition to the static synchronous series compensator, other device includes two converters and the corresponding transformer to perform isolation and transformer functions. Since the static synchronous series compensator is generally performed as an additional operation mode for other devices, it can also be included in the same kind.

At present, the series end of series compensation devices or integrated control devices is connected to power grids through series transformers. The 110 kV and above power grids in China mostly adopt double-circuit line structure, which requires two series transformers to connect two sets of series compensation devices to double-circuit lines respectively, which inevitably increases area occupation and investment costs, and at the same time, multiple series transformers also increase the overall loss. For power grids with more circuit structures, cost, area occupation and equipment loss will further limit the application of series compensation devices. In order to solve the above shortcomings and improve the economy of FACTS access to power grid, a series compensation device more suitable for double-circuit lines is needed.

SUMMARY OF THE INVENTION

The purpose of the present invention is to provide a series compensation device suitable for double-circuit lines, which is designed in comprehensive consideration of cost, volume and equipment loss, and satisfies the economy and reliability of FACTS connected to power grid.

In order to achieve the above purposes, the solution of the present invention is described as below:

A series compensation device for double-circuit lines comprises at least one voltage source converter and one three-phase multi-winding transformer, wherein at least two windings of the three-phase multi-winding transformer are connected in series into the double-circuit lines respectively, and at least one winding is connected to an AC side of the voltage source converter.

According to the series compensation device suitable for double-circuit lines, three phases of the at least one winding of the three-phase multi-winding transformer that is connected to the voltage source converter are star-connected and grounded directly, star-connected and grounded via a resistor, or delta-connected.

According to the series compensation device suitable for double-circuit lines, when the three-phase multi-winding transformer adopts a three-phase integrated structure, it includes a delta-connected balancing winding which operates without load.

According to the series compensation device for double-circuit lines, when there are a plurality of voltage source converters, the connection modes of the converters include but not limited to: AC sides of all the voltage source converters are connected in parallel and then connected to one winding of the transformer; all the voltage source converters are connected to multiple windings of transformer respectively, and each voltage source converter is connected to one corresponding winding of the transformer; all the voltage source converters are divided into several groups, and each group is connected in parallel and then connected to one of multiple windings of the transformer.

According to the series compensation device for double-circuit lines, some or all of following devices are arranged between the voltage source converter and the transformer, including but not limited to: circuit breakers, isolators, arresters, and bypass devices.

According to the series compensation device for double-circuit lines, the bypass devices are configured in phase-to-phase or line-to-line of AC systems and comprise a breaker, a thyristor valve, or a spark gap.

According to the series compensation device for double-circuit lines, some or all of following devices are arranged between the multi-winding transformer and power transmission lines, including but not limited to: circuit breakers, isolators, arresters, and bypass devices.

According to the series compensation device for double-circuit lines, the series compensation device may be used for multiple-circuit lines, and accordingly the multiple-circuit lines are connected to multiple windings of the transformer by split-phase series connection.

According to the series compensation device for double-circuit lines, the series compensation device can be installed independently in power transmission system, and the series compensation device can be connected to a power transmission line as a part of (but not limited to) a unified power flow controller, a convertible static compensator, a static synchronous series compensator, an inter-line power flow controller or a unified power quality regulator.

By using the above-mentioned solution, the present invention comprises only one series transformer and can realize the connection for double-circuit lines through multiple windings. The transformer is divided into two parts: valve side windings and line side windings. In normal operation, the total current of the valve side windings (converted to the line side) is equal to the total current of the line side windings, while in normal operation, the total current of double-circuit lines is always far less than 2*rated current of the line. Therefore, the total current of all converters (converted to the line side) only needs to be selected as the maximum possible operation current of the line current. If a series compensation device is used for each circuit line, the current of the converter of each series compensation device (converted to the line side) must be equal to the rated current of the line. For double-circuit lines, the total current of the converter of two series compensation devices is equal to 2*rated current of the line; while using the solution of the present invention, the total current of the converter can be far less than 2*rated current line, that is, under the same rated output voltage, the converter capacity of the present solution is far less than that of conventional solution, which improves the operation efficiency of series compensation device, saves the cost of device, saves the occupied area and equipment cost of the series transformer, and improves economy and reliability for FACTS connected to power grid.

DETAILED DESCRIPTION OF THE EMBODIMENTS

The specific embodiments of the present invention are described in detail below in conjunction with the accompanying drawings.

Figure 1:
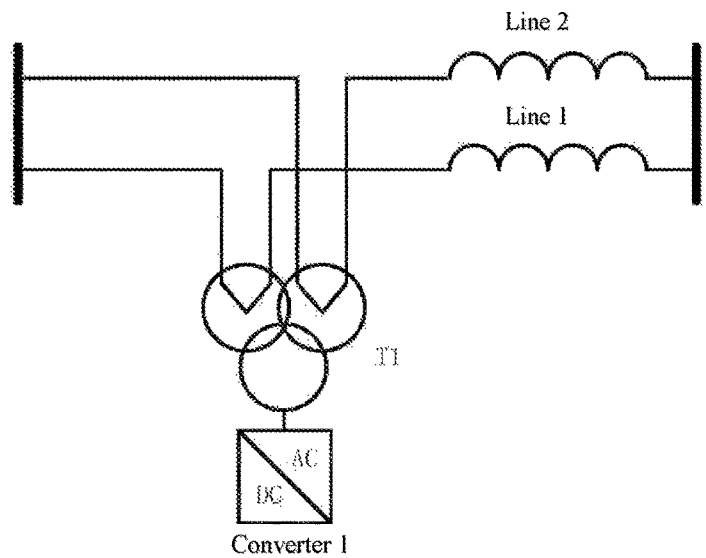
FIG. 1 is a schematic diagram of a wiring structure of a series compensation device suitable for double-circuit line in the present invention.

The present invention provides a series compensation device suitable for double-circuit lines, which comprises at least one voltage source converter and one three-phase multi-winding transformer, wherein at least two windings of the three-phase multi-winding transformer are connected in series into the double-circuit lines respectively, and at least one winding is connected to an AC side of the voltage source converter. As shown in FIG. 1, the converter and double-circuit transmission lines are connected with three windings of the multi-winding transformer respectively, which constitute the minimum structure of the device.

Figure 2:
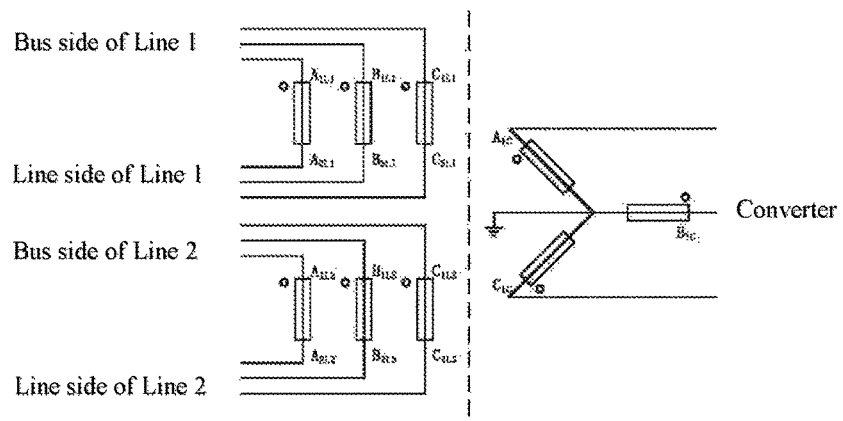
FIG. 2 is a schematic diagram of a connection method of a star-connected winding grounded directly at the converter side of a multi-winding transformer in the present invention.
Figure 3:
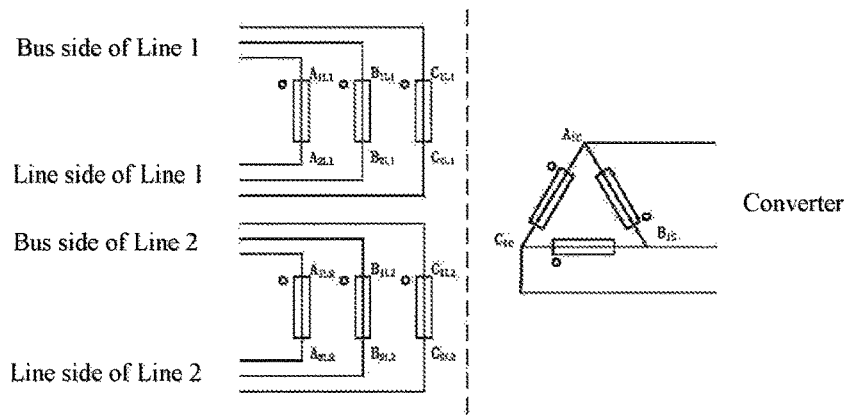
FIG. 3 is a schematic diagram of a connection method of a delta-connected winding at the converter side of a multi-winding transformer in the present invention.

According to the above-mentioned series compensation device suitable for double-circuit lines, three phases of the at least one winding of the three-phase multi-winding transformer that is connected to the voltage source converter are star-connected and grounded directly, star-connected and grounded via a resistor, or delta-connected. FIG. 2 and FIG. 3 show respectively schematic diagrams of connection methods of a star-connected winding grounded directly and a delta-connected winding at converter side.

Figure 4:
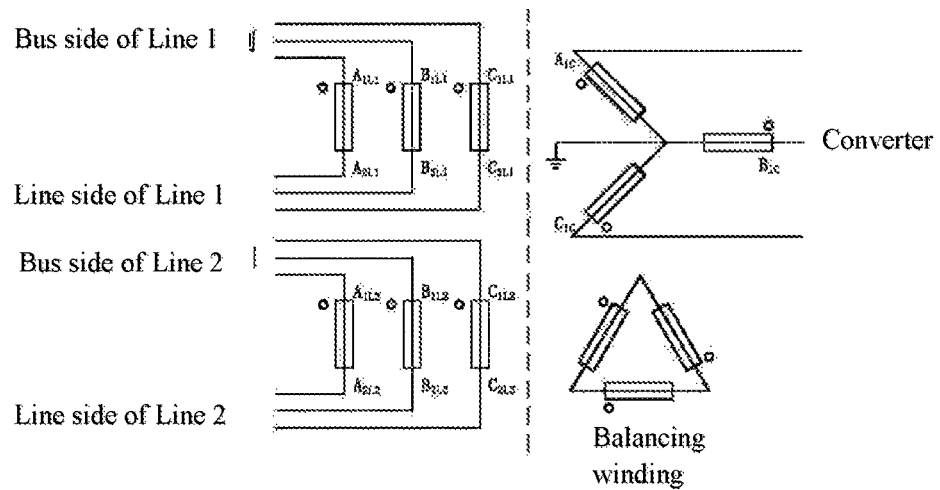
FIG. 4 is a schematic diagram of a connection method of a multi-winding transformer with a balancing winding in the present invention.

According to the above-mentioned series compensation device suitable for double-circuit lines, when the multi-winding transformer adopts a three-phase integrated structure, it includes a delta-connected balancing winding which operates without load. FIG. 4 shows a schematic diagram of the multi-winding transformer with a balancing winding.

Figure 5:
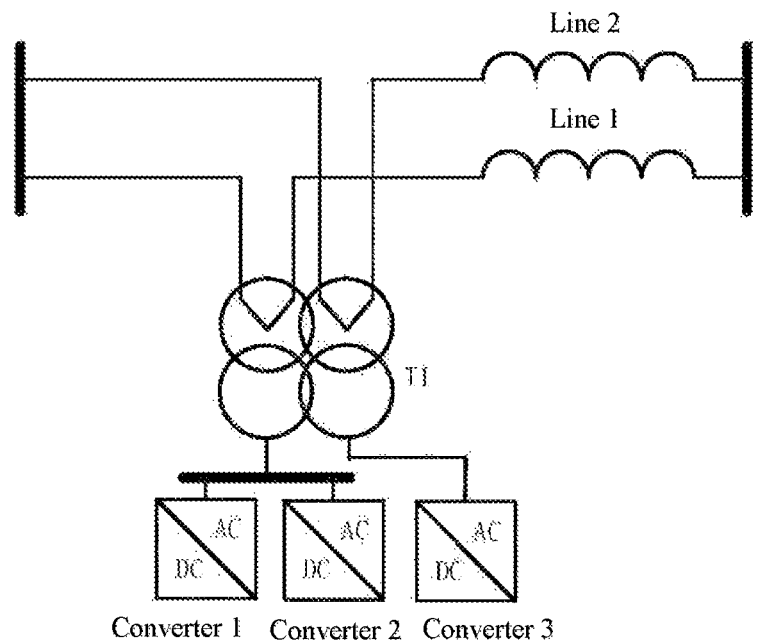
FIG. 5 is a schematic diagram of a wiring mode in which multiple converters are connected in the present invention.

According to the above-mentioned series compensation device suitable for double-circuit lines, when there are a plurality of voltage source converters, the connection mode of multiple converters includes but not limited to: AC sides of all converters are connected in parallel and then connected to one winding of the transformer; all the converters are connected to multiple windings of transformer respectively, and each converter is connected to one corresponding winding of the transformer; as shown in FIG. 5, all the converters are divided into several groups, and each group is connected in parallel and then connected to one of multiple windings of the transformer.

According to the above-mentioned series compensation device suitable for double-circuit lines, there are but not limited to some or all of following devices arranged between converters and transformers: circuit breakers, isolators, arresters, and bypass devices.

According to the above-mentioned series compensation device suitable for double-circuit lines, the bypass devices are configured in phase-to-phase or line-to-line of the AC systems, and comprise a breaker, a thyristor valve, or a spark gap.

According to the above-mentioned series compensation device suitable for double-circuit lines, there are but not limited to some or all of following devices arranged between the multi-winding transformer and power transmission lines: circuit breakers, knife gates, lightning arresters, bypass devices and some or all devices.

Figure 6:
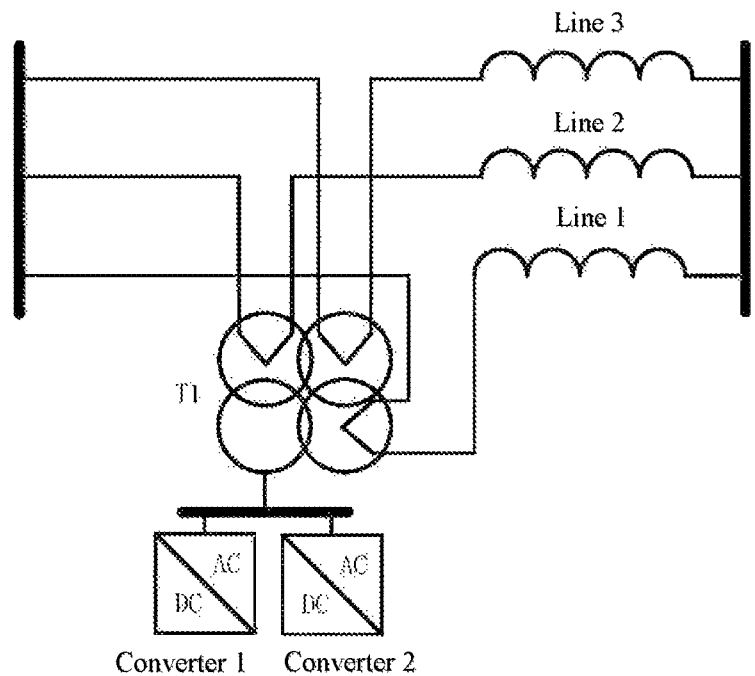
FIG. 6 is a schematic diagram of a wiring mode extended to a three-circuit line of the present invention.

According to the above-mentioned series compensation device suitable for double-circuit lines, the series compensation device may be used for multiple-circuit lines, and accordingly, the multiple-circuit lines are connected to multiple windings of the transformer by split-phase series connection. As shown in FIG. 6, three-circuit lines are connected to three windings of the transformer at the line side by split-phase series connection, respectively, and two converters are connected in parallel and then connected to one winding of the transformer.

Figure 7:
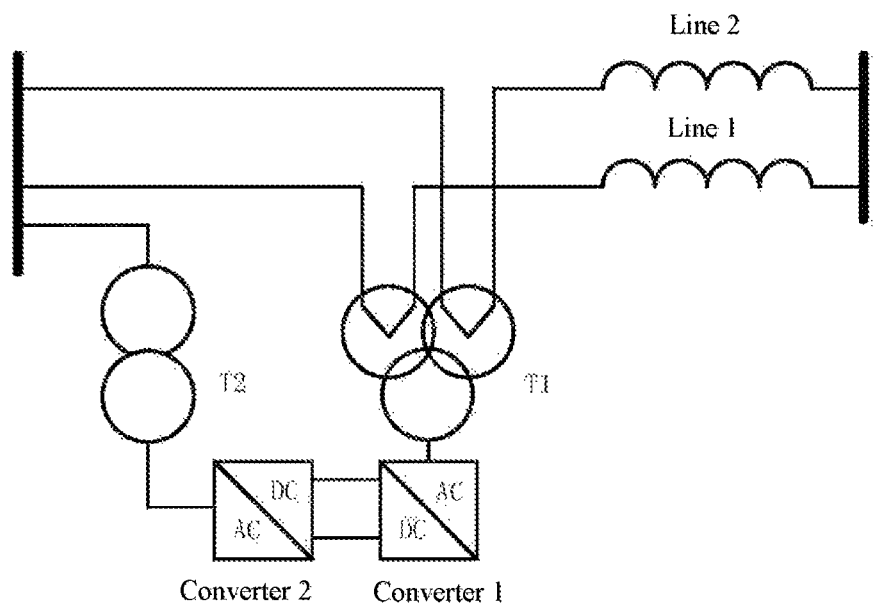
FIG. 7 is a schematic diagram of a wiring structure of the invention as an integral part of a unified power flow controller.

According to the above-mentioned series compensation device suitable for double-circuit lines, the series compensation device can be installed independently in a power transmission system, and the series compensation device can be connected to a power transmission line as a part of (but not limited to) a unified power flow controller, a convertible static compensator, a static synchronous series compensator, an inter-line power flow controller or a unified power quality regulator. FIG. 7 shows a usage as part of the unified power flow controller.

By using the above-mentioned solution, the present invention comprises only one series transformer and can realize the connection for double-circuit lines through multiple windings. The transformer is divided into two parts: valve side windings and line side windings. In normal operation, the total current of the valve side windings (converted to the line side) is equal to the total current of the line side windings, while in normal operation, the total current of double-circuit lines is always far less than 2*rated current of the line. Therefore, the total current of all converters (converted to the line side) only needs to be selected as the maximum possible operation current of the line current. If a series compensation device is used for each circuit line, the current of the converter of each series compensation device (converted to the line side) must be equal to the rated current of the line. For double-circuit lines, the total current of the converter of two series compensation devices is equal to 2*rated current of the line; while using the solution of the present invention, the total current of the converter can be far less than 2*rated current line, that is, under the same rated output voltage, the converter capacity of the present solution is far less than that of conventional solution, which improves the operation efficiency of series compensation device, saves the cost of device, saves the occupied area and equipment cost of the series transformer, and improves economy and reliability for FACTS connected to power grid.

The technical solutions of the present invention have been described with reference to the above embodiments, which are merely illustrative of the technical scope of the present invention. It should be understood by those skilled in the art that any modification or equivalent replacement can be made to the specific embodiments of the invention by those skilled in the art, these modification or equivalent replacement also fall within the scope of the claims of the invention.

The invention claimed is:

1. A series compensation device for double-circuit lines, characterized in that: the device comprises at least one voltage source converter and one three-phase multi-winding transformer, wherein at least two windings of the three-phase multi-winding transformer are connected in series into the double-circuit lines respectively, and at least one winding of the three-phase multi-winding transformer is connected to an AC side of the voltage source converter.

2. The series compensation device for double-circuit lines according to claim 1, characterized in that: three phases of the at least one winding of the three-phase multi-winding transformer that is connected to the voltage source converter are star-connected and grounded directly, star-connected and grounded via a resistor, or delta-connected.

3. The series compensation device for double-circuit lines according to claim 1, characterized in that: when the three-phase multi-winding transformer adopts a three-phase integrated structure, the three-phase multi-winding transformer comprises a delta-connected balancing winding which operates without load.

4. The series compensation device for double-circuit lines according to claim 1, characterized in that: when there are a plurality of voltage source converters, connection modes of the voltage source converters include: AC sides of all the voltage source converters are connected in parallel, and then connected to one winding of the three-phase multi-winding transformer; all the voltage source converters are connected to multiple windings of the three-phase multi-winding transformer respectively, and each voltage source converter is connected to one corresponding winding of the three-phase multi-winding transformer; all the voltage source converters are divided into several groups, and each group is connected in parallel and then connected to one of multiple windings of the three-phase multi-winding transformer.

5. The series compensation device for double-circuit lines according to claim 1, characterized in that: some or all of following devices are arranged between the voltage source converter and the three-phase multi-winding transformer: circuit breakers, isolators, arresters, and bypass devices.

6. The series compensation device for double-circuit lines according to claim 5, characterized in that: the bypass devices are configured in phase-to-phase or line-to-line of AC systems, and comprise a breaker, a thyristor valve or a spark gap.

7. The series compensation device for double-circuit lines according to claim 1, characterized in that: some or all of following devices are arranged between the three-phase multi-winding transformer and power transmission lines: circuit breakers, isolators, arresters, and bypass devices.

8. The series compensation device for double-circuit lines according to claim 1, characterized in that: when the series compensation device is used for multiple-circuit lines, the multiple-circuit lines are connected to multiple windings of the three-phase multi-winding transformer by split-phase series connection.

9. The series compensation device for double-circuit lines according to claim 1, characterized in that: the series compensation device can be installed independently in a power transmission system, and the series compensation device can be connected to a power transmission line as a part of a unified power flow controller, a convertible static compensator, a static synchronous series compensator, an inter-line power flow controller, or a unified power quality regulator.

* * * * *